… …

UNITED STATES PATENT OFFICE 2,563,795

DIBENZOTHIOPHENE DERIVATIVES

Mario Scalera, Somerville, and Dale R. Eberhart, Bound Brook, N. J., assignors to American Cyanamid Company, New York, N. Y., a corporation of Maine No Drawing. Application August 20, 1948, Serial No. 45,425

6 Claims. (Cl. 260—329.3)

This invention is concerned with optical bleaching and brightening and especially with new derivatives of benzothiophene distinguished by their remarkable utility for this purpose. More specifically the invention relates to water-soluble derivatives of acylated 3,7-diaminodibenzothiophene dioxides and their use.

In particular the invention utilizes a novel group of compounds which are sulfonates of the formula:

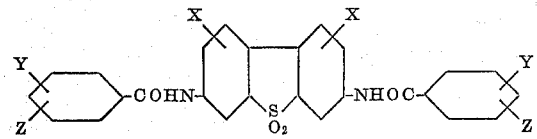

in which X and Y are either hydrogen or sulfonate radicals and Z is hydrogen or a lower alkoxy radical. At least one of X or Y but not both must be a sulfonic grouping, either the sulfonic acid radical per se or an alkali metal salt thereof.

It is well known that cellulosic materials tend to develop an undesirable yellowish cast with age. Development of this yellowness is aggravated among other reasons, by continued exposure to light, weathering and repeated launderings. It is, therefore, particularly troublesome in plastics and textile fabrics that must be subjected to these conditions. Unfortunately it cannot be removed by ordinary simple bleaching or scouring.

For many years, it has been the practice to attempt to conceal this yellowing by the use of blue pigments or dyes, to neutralize the complementary yellow color of the cellulose. For this purpose, the use of blue pigments, such as Ultramarine or Alkali Blue, or of fugitive blue dyestuffs, has become common practice in paper manufacture and laundry operations.

While these blue coloring matters are often temporarily effective they are subject to serious disadvantages. For example, addition of a blue color to a yellow does not produce pure white, but rather a gray. The greater the intensity of the original yellow, the more bluing necessary to hide it, and the darker in cast the resulting gray. Further, unless an exact color balance is struck, the finished product is not even gray but may actually be blue.

Some twenty years ago a different method of overcoming these difficulties was suggested. Instead of using a blue coloring matter to absorb yellow light, it was proposed to use a fluorescent substance capable of emitting blue light. Thus, the yellowing effect, which consists in absorbing the blue light, is truly destroyed by a substance which emits the blue light lost, resulting in true white instead of gray.

No widespread acceptance of this proposal occurred. This was largely due to the lack of accepted materials. To be suitable for this purpose, a compound should possess the properties of being:

1. Colorless in white light;
2. Strongly fluorescent under the influence of ultraviolet rays such as are present in sunlight;
3. Fluorescing blue-white;
4. Sufficiently substantive to be absorbed from very low concentrations;
5. Resistant to soap, chlorine, light and other such common agents;
6. Free from the tendency to decompose to colored products;
7. Reasonably cheap in proportion to effectiveness.

None of the available materials were suitable in all of these properties. It was particularly difficult to satisfy the third, fourth and fifth requirements.

It is, therefore, a principal object of the present invention to develop new compounds suitable for use as optical bleaching agents and combining the above-listed properties. This object has been accomplished, in a most surprising and unpredictable manner, by the sulfonated derivatives of the above shown substitution products of acylated 3,7-diaminodibenzothiophene sulfones. These compounds combine to an amazing degree the various desirable properties of affinity, high strength, physical and chemical stability, substantivity, and fluorescent hue. Since current theories of substantivity and fluorescence are somewhat vague, the present invention is not restricted to any particular theory of action.

The compounds herein disclosed will effectively neutralize the yellowness of cellulosic textiles even when applied from very minute concentrations. On the other hand, they can be applied from relatively concentrated solution when it is desired to produce greatly enhanced whiteness and brilliance of discharge effects. The application of these agents may be carried out in a separate rinse bath; or they may be used in conjunction with the soaping operation; or the agents may be incorporated in the soap and marketed in that form to enhance the cleansing and whitening action of the soap; or they may be used in any manner known to the trade.

These compounds also possess valuable properties other than as bleaching or whitening agents. For example they enhance the color effect of many different dyes and pigments. Their mode of application may vary, being used as a preliminary treatment of the fabric; applied with other dyes in some cases, or applied as an after treatment in conjunction with dyes, pigments and other finishing materials.

Utilization of the compounds of this invention is not limited to treatment of textile fabrics. They may also be beneficially used in the manufacture of paper and felt products and in making transparent or translucent sheets or pellicles of cellulose of other origin. Their usefulness also extends to mutually compatible varnishes, plastic coatings and white or colored plastic shapes.

The compounds of the present invention may be prepared in a variety of ways. 3,7-diaminodibenzothiophene sulfone and its substitution products may be acylated in the normal manner with such acylating agents as acetic anhydride; butyryl chloride; trifluoroacetyl chloride; adipyl chloride; crotonic chloride; ethoxyacetyl chloride; maleic anhydride; benzoyl and phenylacetyl chloride and the alkyl, halo, nitro, amino, and oxygenated substitution products thereof; the naphthoyl chlorides; phthalic anhydrides; 2-hydroxy-3-naphthoyl chloride; phenoxyacetyl chloride; cinnamic chloride; hydrocinnamic chloride; hexahydrobenzoyl chloride; cyclohexylacetyl chloride; furoyl chloride; nicotinic chloride; picolinic chloride; cinchoninic acid chloride; and thiophene-alpha-carboxylic acid chloride. These acylating agents may be employed in a neutral or basic organic solvent or in an aqueous medium.

The corresponding sulfonic acid derivatives may also be used, such as methanesulfonyl chloride; the chlorides of benzenesulfonic and toluene-omega-sulfonic acid and their substitution products; the naphthalenesulfonyl chlorides; acetylsulfanilyl chloride and its substitution products and beta-pyridinesulfonyl chloride.

Useful substances according to the present invention are also prepared when acylations of diaminobenzothiophene sulfones are carried out with derivatives of carbamic and thiocarbamic acids, resulting in carbamides and thiocarbamides. Typical derivatives of this type are the phenyl and naphthyl isocyanate and isothiocyanate; p-dimethylaminophenyl isothiocyanate; and diethylcarbamyl chloride. A difunctional acylating agent, such as phosgene, may be used to link together two molecules of dibenzothiophene sulfone. By the proper choice of reagents and conditions, the 3- and 7-nitrogens may be substituted by the same or different acyl groups.

The introduction of the sulfonic acid groups, which is necessary for solubility, may be carried out before or after the acylation step. If it is desired that the sulfonic acid group or groups shall be linked to the dibenzothiophene nucleus, either the free diamine or an aliphatic acyl derivative thereof may be subjected to sulfonation. With aromatic acyl derivatives, on the other hand, it is often possible to sulfonate in the acyl nucleus.

While the sulfonation can be carried out in the conventional manner with sulfuric acid, it is frequently advantageous to use chlorosulfonic acid, with or without a solvent. This provides a smooth method of conducting the reaction, and tends to simplify the problem of isolating the product. It has been found that nitrohydrocarbons, such as nitromethane, nitropropane, and nitrobenzene, are highly suitable solvents for the reaction with chlorosulfonic acid. After completion of the reaction, the solvent is easily removed by steam distillation.

It is a particular feature of this invention that it has been found possible, by operating in a nitrohydrocarbon such as nitrobenzene, to acylate the free dibenzothiophene sulfone diamine, and then to proceed immediately to the sulfonation with chlorosulfonic acid, without previous isolation.

This process is of wide applicability, the best choice of reaction conditions for a given case being somewhat dependent on the reactivity and stability of the reactants. It has been found that it is generally convenient to carry out the acylation at 100°–150°, the reaction being continued until primary amino groups are no longer detectable as, for example, by diazotization with nitrous acid.

The ensuing sulfonation may advantageously be conducted at a somewhat lower temperature. It is desirable to cool while the chlorosulfonic acid is added; frequently the sulfonation can then be completed around room temperature. When the sulfonation is finished, the reaction mixture is drowned in ice and water, and the solvent removed by steam distillation. The product is isolated in good yield and purity, either as the free sulfonic acid or a salt thereof. The salts are of equal technical importance to the free acids and are understood to be their obvious equivalents.

This invention is further illustrated by the following examples. All parts are by weight except as otherwise noted.

*Example 1*

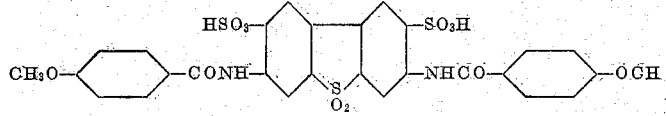

To 3 parts by weight of dry 3,7-diaminodibenzothiophenesulfone-2,8-disodium sulfonate are added 7.7 parts of p-anisoyl chloride and ¼ to ½ part of pyridine. The mixture is stirred and heated to 150°–160°, cooled, diluted with acetone, filtered, washed, suspended in hot, dilute $Na_2CO_3$ solution, filtered, washed and dried to give a light brown product dissolving in water to a strongly blue fluorescent solution. The product is valuable for whitening cellulosic and other materials.

*Example 2*

If, in the above example, the anisoyl chloride is substituted by p-toluyl chloride, the di-p-toluyl derivative is obtained as a light yellow product having a similar shade of fluorescence.

*Example 3*

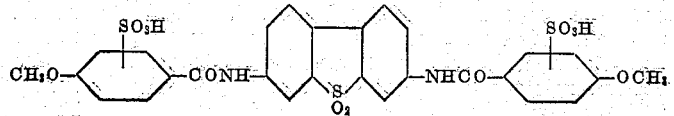

To 12.3 parts of 3,7-diaminodibenzothiophene sulfone in 90 parts of nitrobenzene are added 20.4 parts of p-anisoyl chloride at 100°–150° C. The mixture is stirred at 150° until primary amino groups can no longer be detected, then cooled and 29 parts of chlorosulfonic acid added during 5 minutes at 10°–20° C. After stirring 1½ hours at 20°–25°, another 29 parts of chlorosulfonic acid are added and the mixture stirred at 25° until the reaction is complete. The mixture is drowned in a mixture of ice and 50 g. salt, filtered, the cake neutralized and nitrobenzene steamed off, or the drowned mixture may be neutralized directly and steam-stripped. After filtration, washing and drying, a light yellow product is obtained, soluble in water to a blue fluorescent solution.

*Example 4*

3,7-diaminobenzothiophene sulfone is reacted with anisoyl chloride as described in Example 3. When the reaction is complete, the nitrobenzene is removed by steam distillation and the product filtered and dried. Three parts of the 3,7-dianisoylaminodibenzothiophene sulfone thus prepared is added over a period of one-half hour to 13.6 parts of chlorosulfonic acid at −10° C., keeping the temperature below 0°. The temperature is then allowed to rise to 5°–10° and held until the reaction is complete. The mixture is drowned in ice, warmed to 60°, neutralized, treated with salt, and filtered. The product is washed with dilute brine and dilute sodium carbonate solution and dried to give a light yellow product similar to that prepared in Example 3.

We claim:

1. A sulfonate selected from the group consisting of compounds of the formula:

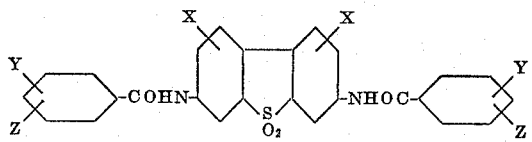

and the alkali metal salts thereof in which X and Y are selected from the group consisting of hydrogen and the sulfonic acid and alkali metal sulfonate radicals at least one but not more than one of X and Y being a sulfonic radical and Z is selected from the group consisting of hydrogen and the lower alkyl and alkoxy radicals.

2. A compound of the formula

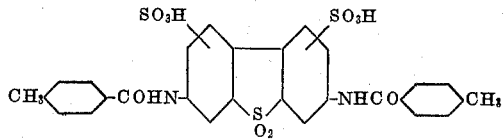

and its alkali metal salts.

3. A compound of the formula

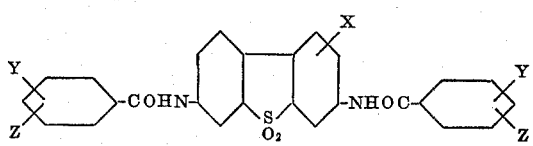

and its alkali metal salts.

4. A sulfonate selected from the group consisting of compounds of the formula

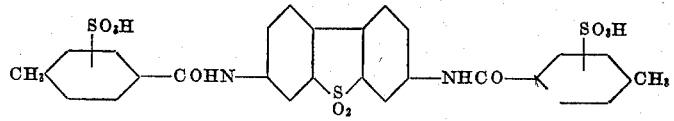

and the alkali metal salts thereof in which X and Y are selected from the group consisting of hydrogen and the sulfonic acid and alkali metal sulfonate radicals at least one but not more than one of X and Y being a sulfonic radical and Z is selected from the group consisting of hydrogen and the lower alkyl and alkoxy radicals.

5. A compound of the formula

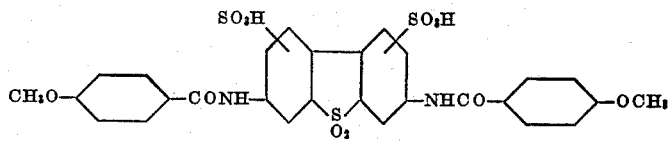

and its salts.

6. A compound of the formula

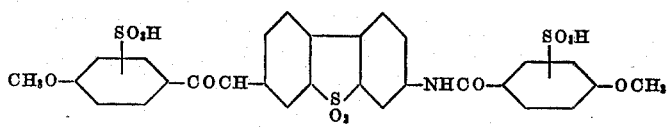

and its salts.

MARIO SCALERA.
DALE R. EBERHART.

REFERENCES CITED

The following references are of record in the file of this patent:

UNITED STATES PATENTS

| Number | Name | Date |
|---|---|---|
| 2,149,335 | Dahlen | Mar. 7, 1939 |

FOREIGN PATENTS

| Number | Country | Date |
|---|---|---|
| 174,886 | Switzerland | Apr. 16, 1935 |

Certificate of Correction

Patent No. 2,563,795 August 7, 1951

MARIO SCALERA ET AL.

It is hereby certified that error appears in the printed specification of the above numbered patent requiring correction as follows:

Column 6, claim 6, for that portion of the formula reading and that the said Letters Patent should be read as corrected above, so that the same may conform to the record of the case in the Patent Office.

Signed and sealed this 22nd day of January, A. D. 1952.

[SEAL]

THOMAS F. MURPHY,
*Assistant Commissioner of Patents.*